(12) United States Patent
Hattori et al.

(10) Patent No.: US 10,862,353 B2
(45) Date of Patent: Dec. 8, 2020

(54) AXIAL GAP MOTOR ROTOR AND AXIAL GAP MOTOR

(71) Applicant: DENSO CORPORATION, Aichi-pref. (JP)

(72) Inventors: Akihisa Hattori, Toyohashi (JP); Seiya Yokoyama, Toyohashi (JP); Yoji Yamada, Hamamatsu (JP)

(73) Assignee: DENSO CORPORATION, Aichi-pref. (JP)

( * ) Notice: Subject to any disclaimer, the term of this patent is extended or adjusted under 35 U.S.C. 154(b) by 477 days.

(21) Appl. No.: 15/627,086

(22) Filed: Jun. 19, 2017

(65) Prior Publication Data
US 2017/0366050 A1 Dec. 21, 2017

(30) Foreign Application Priority Data

Jun. 21, 2016 (JP) .................................. 2016-122803

(51) Int. Cl.
| | |
|---|---|
| *H02K 1/28* | (2006.01) |
| *H02K 1/02* | (2006.01) |
| *H02K 1/27* | (2006.01) |
| *H02K 16/04* | (2006.01) |
| *H02K 21/24* | (2006.01) |
| *H02K 16/02* | (2006.01) |

(52) U.S. Cl.
CPC ............ *H02K 1/02* (2013.01); *H02K 1/2793* (2013.01); *H02K 16/04* (2013.01); *H02K 21/24* (2013.01); *H02K 1/28* (2013.01); *H02K 16/02* (2013.01); *H02K 2213/03* (2013.01)

(58) Field of Classification Search
CPC ........... H02K 1/2793; H02K 1/28; H02K 1/30
See application file for complete search history.

(56) References Cited

U.S. PATENT DOCUMENTS

| | | | |
|---|---|---|---|
| 6,373,162 B1 * | 4/2002 | Liang .................. | H02K 1/2793 310/112 |
| 8,624,456 B2 * | 1/2014 | Lamperth ............ | H02K 1/2793 310/156.12 |
| 2016/0322869 A1 | 11/2016 | Takezaki et al. | |

FOREIGN PATENT DOCUMENTS

| | | |
|---|---|---|
| JP | 2011-509064 A | 3/2011 |
| JP | 2015116033 A | 6/2015 |
| WO | 2009/087376 A2 | 7/2009 |

* cited by examiner

*Primary Examiner* — Ramon M Barrera
(74) *Attorney, Agent, or Firm* — Kilpatrick Townsend & Stockton LLP

(57) ABSTRACT

An axial gap motor rotor opposes a stator in an axial direction. The axial gap motor rotor includes a rotor core and a magnet. The magnet is arranged on the rotor core. The magnet is configured so that one axial end includes magnetic poles that alternately change in a circumferential direction. The rotor core includes a base, which is located at a center in a radial direction, and radial extensions, which are extended from the base outward in the radial direction and arranged in the circumferential direction. The magnet is configured to at least partially overlap the radial extensions in the axial direction. The radial extensions are located to include a boundary of adjacent ones of the magnetic poles in the circumferential direction.

20 Claims, 5 Drawing Sheets

AXIAL GAP MOTOR ROTOR AND AXIAL GAP MOTOR

BACKGROUND OF THE INVENTION

The present invention relates to an axial gap motor rotor and an axial gap motor.

Japanese Laid-Open Patent Publication No. 2015-116033 describes an example of an axial gap motor known in the art including a rotor and a stator that oppose each other. A gap extends between the rotor and the stator in the axial direction.

The axial gap motor of the publication includes a disk-shaped rotor core (referred to as support in the publication) and magnets fixed in through holes extending through the rotor core. The rotor core includes a base (referred to as hub in the publication) located at the center in a radial direction, radial extensions (referred to as spokes in the publication) extending in the radial direction from the base, and an outer circumferential portion connecting radially outer sides of the radial extensions. The base, the radial extensions, and the outer circumferential portion define the through holes arranged in the circumferential direction. Each magnet is arranged in one of the through holes. That is, each through hole partitioned by the radial extensions of the rotor core includes a magnet.

In the rotor of the axial gap motor, the magnets are arranged in the through holes that are partitioned by the radial extensions of the rotor core. Thus, the radial extensions and the magnets are alternately arranged in the circumferential direction. It is desired that the cogging torque and torque ripple of such a rotor be reduced.

SUMMARY OF THE INVENTION

It is an object of the present invention to provide an axial gap motor rotor and an axial gap motor that reduce the cogging torque and torque ripple.

To achieve the above object, an axial gap motor rotor according to one aspect of the present invention opposes a stator in an axial direction. The axial gap motor rotor includes a rotor core and a magnet. The magnet is arranged on the rotor core. The magnet is configured so that one axial end includes magnetic poles that alternately change in a circumferential direction. The rotor core includes a base, which is located at a center in a radial direction, and radial extensions, which are extended from the base outward in the radial direction and arranged in the circumferential direction. The magnet is configured to at least partially overlap the radial extensions in the axial direction. The radial extensions are located to include a boundary of adjacent ones of the magnetic poles in the circumferential direction.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of an axial gap motor will now be described.

Figure 1:
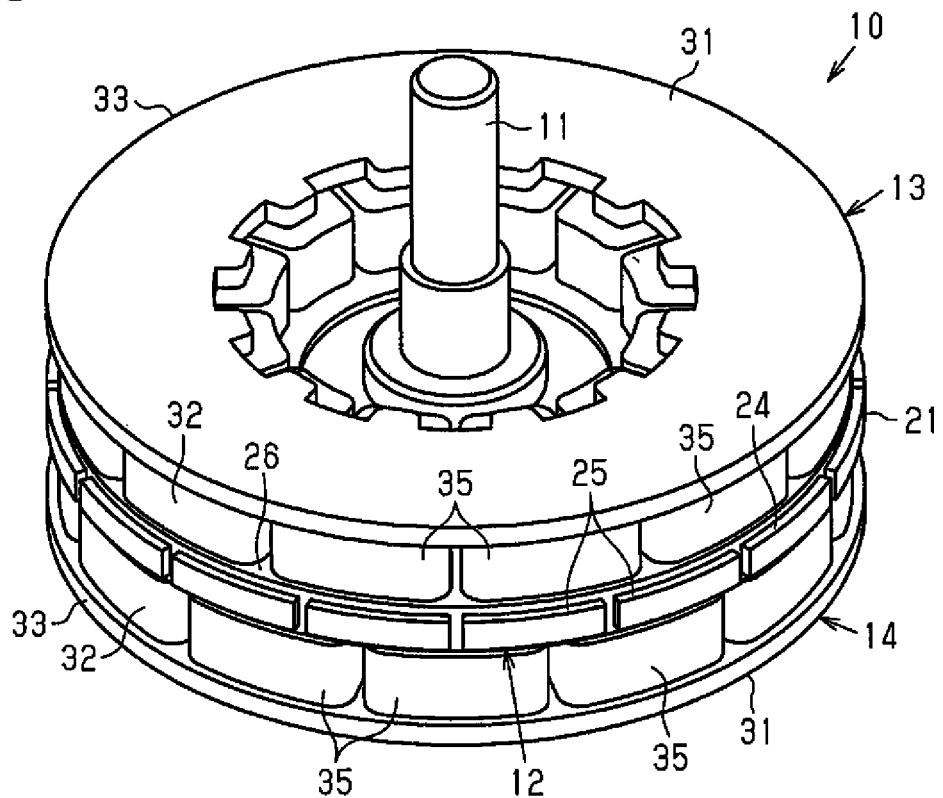
FIG. 1 is a perspective view showing an axial gap motor according to one embodiment of the present invention.

As shown in FIG. 1, an axial gap motor 10 is a motor including a disk-shaped rotor 12 (axial gap motor rotor), which is fixed to and rotated integrally with a cylindrical rotation shaft 11, and two stators 13 and 14 located at the axially outer sides of the rotor 12. The rotor 12 and the stators 13 and 14 are accommodated in a housing (not shown), and the rotation shaft 11 is supported by the housing in a rotatable manner.

As shown in FIGS. 1 to 4, the rotor 12 includes a disk-shaped rotor core 21 and a disk-shaped magnet 26.

The rotor core 21 includes a ring-shaped base 22 including a through hole 22a, into which the rotation shaft 11 is press-fitted, radial extensions 23, which extend outward in the radial direction from the base 22, and an outer circumferential portion 24 located at the radially outer side (for example, radially outer distal ends) of the radial extensions 23.

Figure 5:
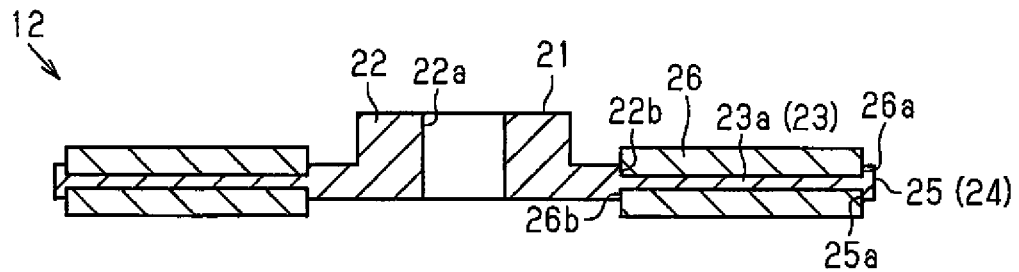
FIG. 5 is a cross-sectional view taken along line 5-5 in FIG. 4.

As shown in FIG. 5, each radial extension 23 includes a thin portion 23a that is thinner in the axial direction than the outer circumferential portion 24 and the base 22. The thin portion 23a has a predetermined length in the radial direction. In the present embodiment, the thin portion 23a is formed by pressing the entire radial extension 23. The radial extensions 23 extend through the magnet 26 (described later) in the radial direction. The two axial sides of each radial extension 23 are covered by the magnet 26.

Figure 4:
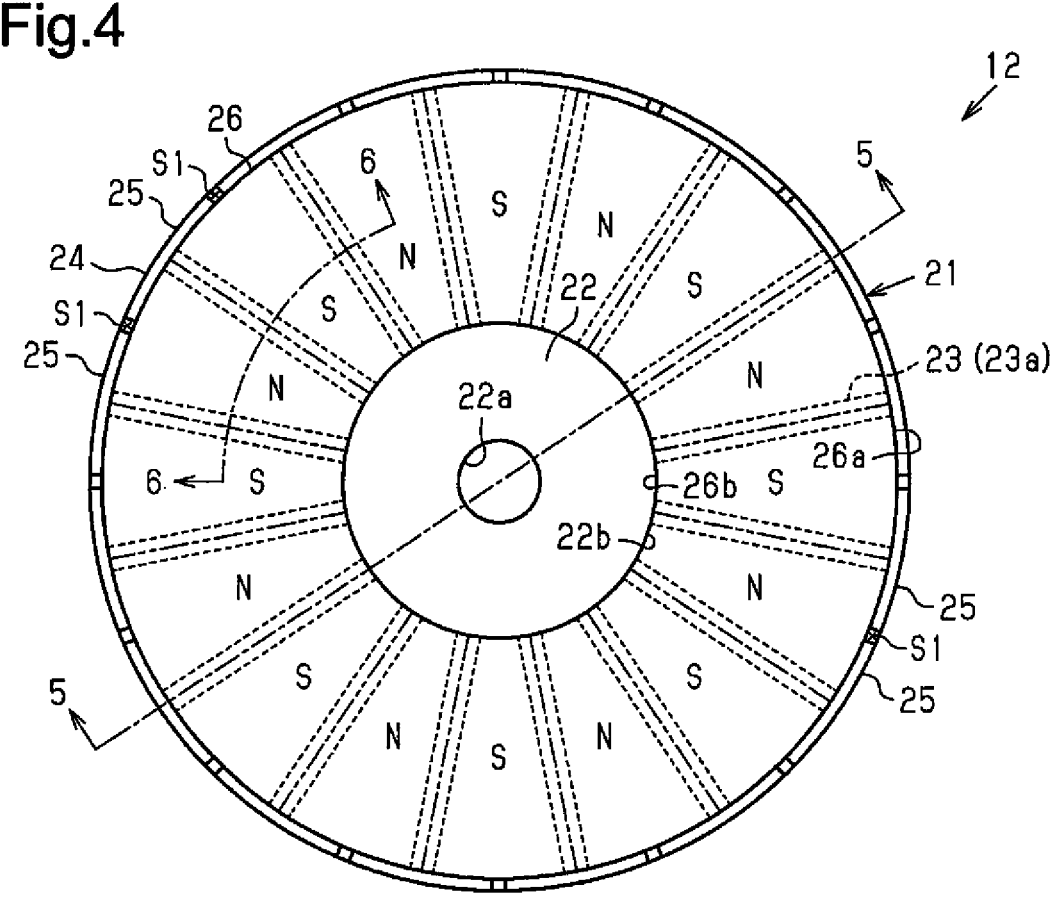
FIG. 4 is a plan view of a rotor shown in FIG. 1.
Figure 6:
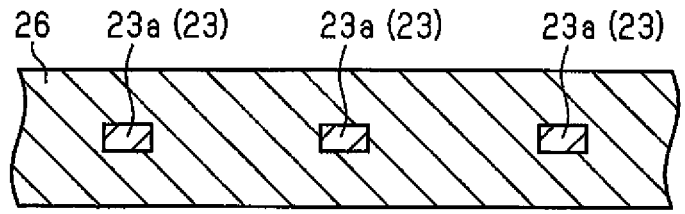
FIG. 6 is a cross-sectional view taken along line 6-6 in FIG. 4.

As shown in FIGS. 4 and 6, the outer circumferential portion 24 is formed by circumferential extensions 25 located at the radially outer sides (for example, radially outer distal ends) of the radial extensions 23 and extended from the radial extensions 23 toward opposite sides in the circumferential direction. The circumferential extensions 25 of the present embodiment are configured to form a gap S1, which serves as a magnetic path interruption portion, in the circumferential direction between the circumferential extensions 25 of adjacent ones of the radial extensions 23. That is, the circumferential extensions 25 of adjacent ones of the radial extension 23 are spaced apart from each other. In the rotor of the present embodiment, the number of the gaps S1 is the same as the number of the radial extensions 23.

The magnet 26 is formed integrally with the rotor core 21.

As shown in FIG. 4, the magnet 26 is magnetized so that magnetic poles at one axial side alternately change in the circumferential direction. Further, the magnet 26 is magnetized so that when the pole at one axial side is an N-pole, the pole at the opposite side, that is, the other axial side, is an S-pole. In FIG. 4, the radial extensions 23 (thin portions 23*a*) are configured to be located on the boundaries (shown by broken line in FIG. 4) of the magnetic poles of the magnet 26.

Figure 3:
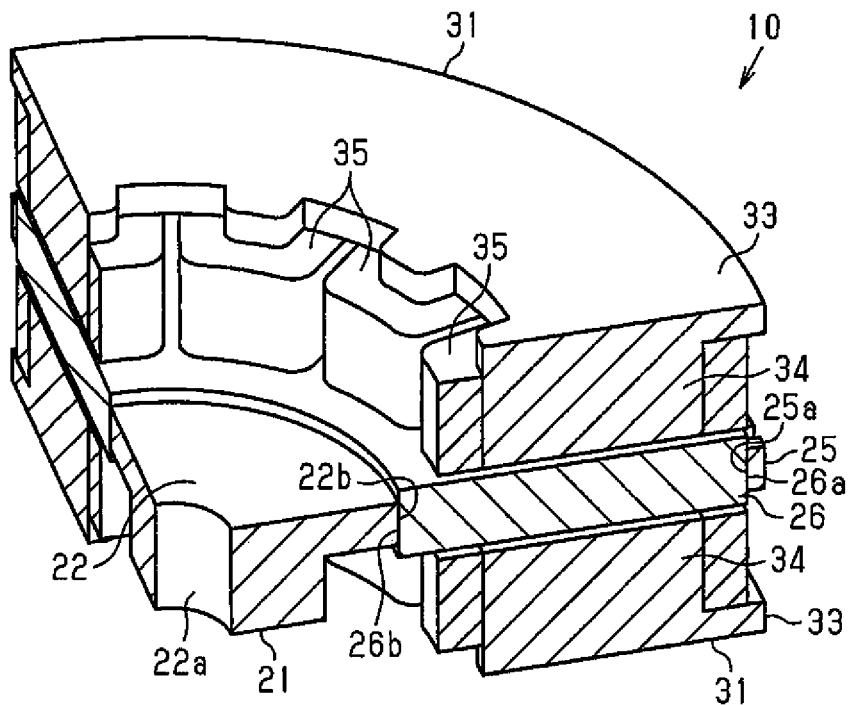
FIG. 3 is a partial cross-sectional perspective view showing the axial gap motor of FIG. 1.

As shown in FIGS. 3 to 5, the magnet 26 is configured so that an outer circumferential surface 26*a* of the radially outer side of the magnet 26 abuts against an inner circumferential surface 25*a* of each circumferential extension 25 (outer circumferential portion 24), and an inner circumferential surface 26*b* of the radially inner side of the magnet 26 abuts against an outer circumferential surface 22*b* of the base 22.

Figure 2:
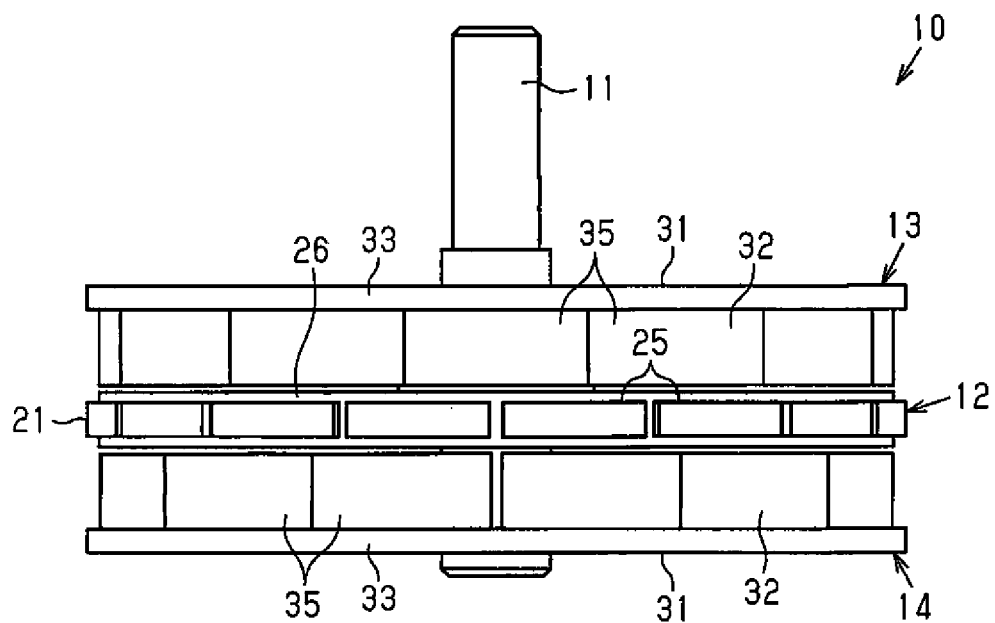
FIG. 2 is a side view showing the axial gap motor of FIG. 1.

As shown in FIGS. 1 to 3, the stators 13 and 14 each include a stator core 31 and a coil group 32 that are wound and arranged on the stator core 31. Further, the stators 13 and 14 are each spaced apart by a slight gap from the rotor 12.

Each stator core 31 includes a base 33, which has the form of a ring-shaped plate, and twelve teeth 34 projecting (extending) from the base 33 toward the rotor 12 in the axial direction. Further, the teeth 34 are arranged at equal angular intervals (in the present embodiment, intervals of 30°) in the circumferential direction. Each tooth 34 is spaced apart from the adjacent tooth 34 in the circumferential direction. The teeth 34 all have the same shape.

The coil group 32 includes twelve coils 35, each of which is wound in a concentration wind around one of the teeth 34. The twelve coils 35 are all wound in the same direction. Further, the coils 35 are arranged in the order of a U-phase coil, a V-phase coil, and a W-phase coil repeatedly in the circumferential direction. That is, the coil group 32 is formed from the coils 35 having three phases, namely, the U-phase, the V-phase, and the W-phase.

The operation of the axial gap motor 10 of the present embodiment will now be described.

The magnet 26 extends through the radial extensions 23 to configure the rotor 12 of the axial gap motor 10 so that the radial extensions 23 of the rotor core 21 entirely overlap the magnet 26 in the axial direction. In such a structure, the magnetic flux densities of the magnetic poles at where the radial extensions 23 are located are more even than when radial extensions do not overlap a magnet in the axial direction like in the prior art. This reduces the cogging torque and torque ripple.

The present embodiment has the advantages described below.

(1) The magnet 26 is configured to overlap the radial extensions 23 in the axial direction. The radial extensions 23 are located to include the boundary of adjacent ones of the magnetic poles in the circumferential direction. Thus, the magnetic flux densities of the magnetic poles at where the radial extensions 23 are located are even. This reduces the cogging torque and torque ripple.

(2) Each radial extension 23 includes the thin portion 23*a* that is thinner in the axial direction than other portions (outer circumferential portion 24, base 22, and the like) of the rotor core 21. Thus, the cross section (cross section cut in axial direction) of each radial extension 23 is smaller than when the thin portion 23*a* is not included. This increases the magnetic resistance and thus limits the generation of eddy current.

(3) The outer circumferential portion 24 is located at the radially outer sides of the radial extensions 23 and extended in the circumferential direction from the radial extensions 23. The outer circumferential portion 24 includes the gaps S1, which serve as magnetic path interruption portions that interrupt a magnetic path. Each gap S1 interrupts a magnetic path of eddy current and thus limits the generation of eddy current.

(4) The outer circumferential portion 24 is thicker in the axial direction than the thin portions 23*a*. The outer circumferential portion 24 abuts against the magnet 26 in the radial direction. That is, since the outer circumferential portion 24 abuts against the magnet 26 in the radial direction, the separation of the magnet 26 from the rotor core 21 is restricted even when the rotor 12 rotates.

(5) Each of the radial extensions 23 is configured so that the two axial sides of the radial extension 23 are covered by the magnet 26. For example, as compared to when a radial extension is exposed from one axial side, magnetic flux is generated at the two axial sides in a well-balanced manner. Thus, good magnetic balance can be obtained by applying the present invention to the structure in which the stators 13 and 14 are arranged at the two axial sides.

(6) The thin portions 23*a* are formed at portions where the magnet 26 is located. This reduces the thickness of the entire rotor 12 even when the magnet 26 is used.

The above embodiment may be modified as described below.

In the above embodiment, the gaps S1 are arranged in the outer circumferential portion 24 to interrupt a magnetic path. However, there is no limit to this structure.

Figure 7:
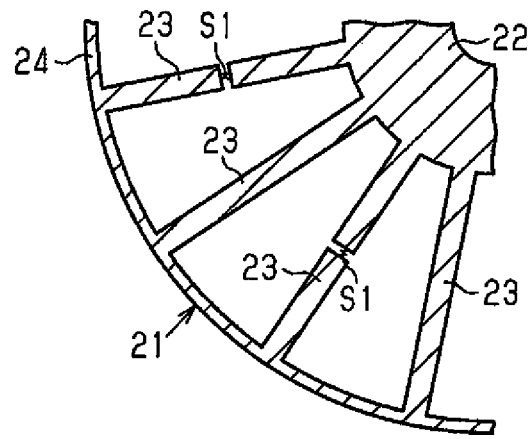
FIG. 7 is a cross-sectional view showing a rotor core of a modified example.

As shown in FIG. 7, the gap S1 may be arranged at a radially middle position of each radial extension 23 to interrupt a magnetic path.

Figure 8:
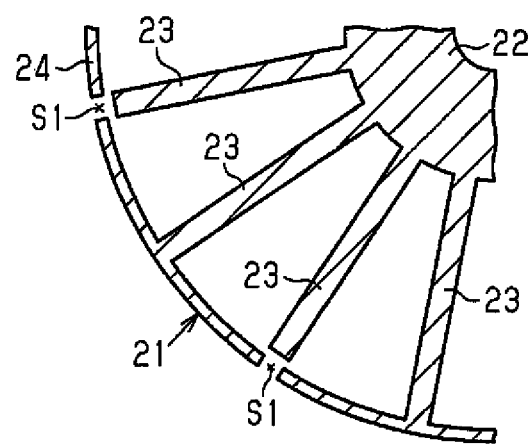
FIG. 8 is a cross-sectional view showing a rotor core of a modified example.

As shown in FIG. 8, the gap S1 may be arranged at the radially outer side (distal end) of each radial extension 23 to interrupt a magnetic path.

In the above embodiment, the number of the radial extensions 23 is equal to the number of the gaps S1. However, the number of the radial extensions 23 and the number of the gaps S1 may be changed.

Figure 9:
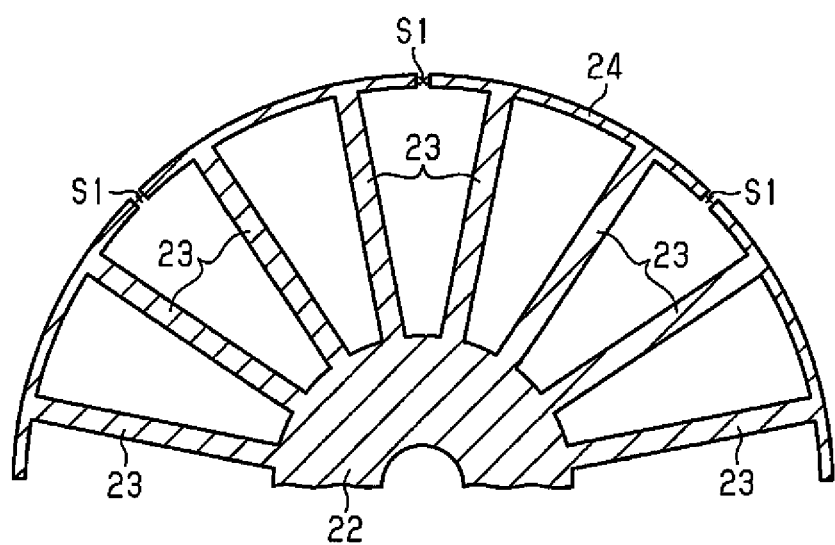
FIG. 9 is a cross-sectional view showing a rotor core of a modified example.

As shown in FIG. 9, the number of the gaps S1 may be half the number of the radial extensions 23. Even in this structure, the gaps S1 interrupt a portion that may form a magnetic path of eddy current. This limits the generation of eddy current as compared to when, for example, the radial extensions 23 are all connected to the outer circumferential portion 24.

In the above embodiment, the single disk-shaped rotor core 21 is used. Instead, the rotor core may be formed by, for example, stacking a plurality of core sheets. In this case, multiple types of core sheets may be used so that some of the core sheets include the gaps S1 and the other core sheets do not include the gaps S1.

In the above embodiment, the radial extensions 23 extend through the magnet 26 in the radial direction, and the radial extensions 23 are entirely embedded in the magnet 26. However, there is no limit to this structure.

For example, the radial extensions 23 may be exposed from one axial surface of the magnet 26.

In the above embodiment, the entire radial extensions 23 overlap the magnet 26 in the axial direction. However, there is no limit to such a structure. For example, as shown in FIG. 10, the radial extensions 23 may partially overlap the magnet 26 in the axial direction.

Figure 10:
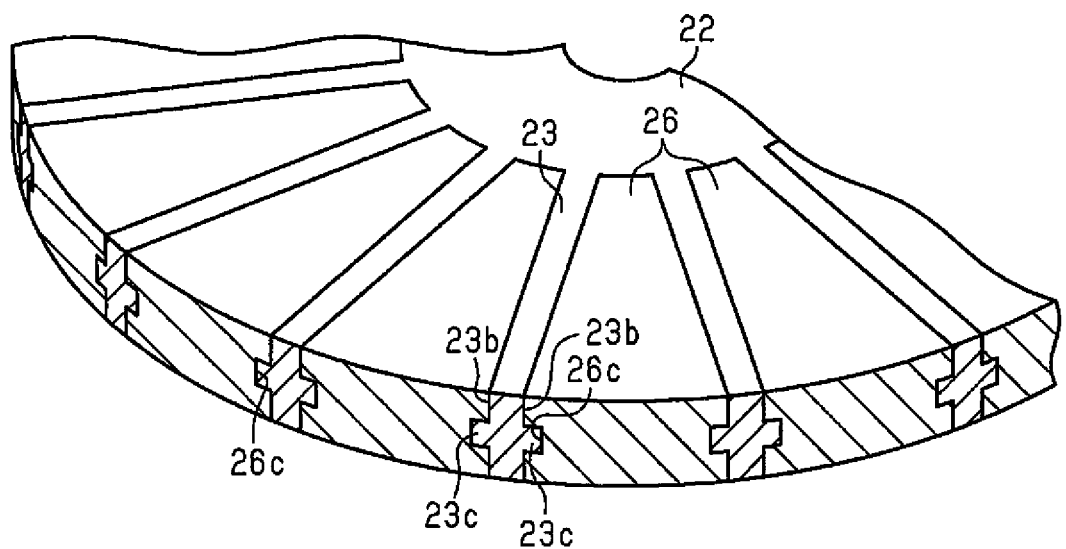
FIG. 10 is a partial cross-sectional perspective view showing a rotor of a modified example.

As shown in FIG. 10, each radial extension 23 may include claws 23*c* extending toward opposite sides in the axial direction from side surfaces 23*b* of the two circumferential sides. For example, each claw 23*c* extends from the axially middle position of the corresponding side surface 23*b*. Each claw 23*c* is fitted to a fitting recess 26*c* of the magnet 26.

In the above embodiment, the outer circumferential portion 24 is formed integrally with the radially outer sides of the radial extensions 23. However, the outer circumferential portion 24 may be omitted.

Figure 11:
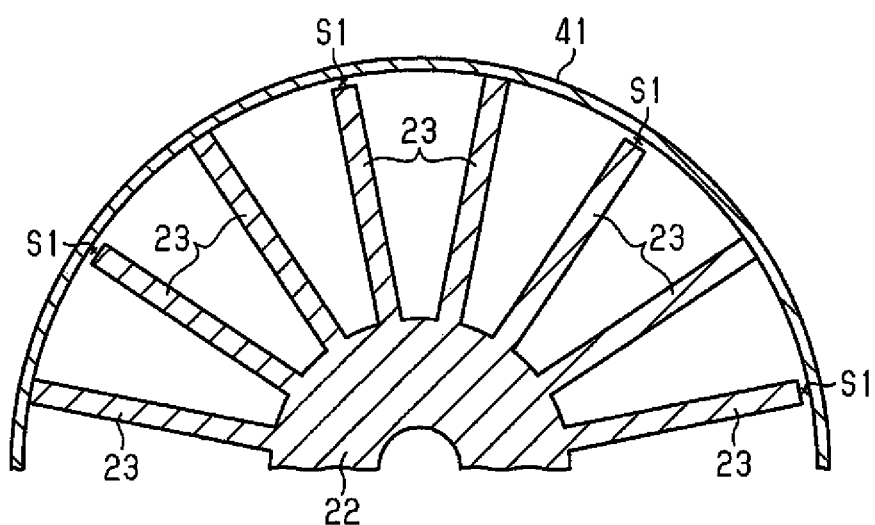
FIG. 11 is a cross-sectional view showing a rotor core and a cover of a modified example.

In this case, it is preferred that a tubular cover 41 be arranged at the outer sides of the radial extensions 23 to restrict the separation of the magnet 26 as shown in FIG. 11. The rotor core 21 shown in FIG. 11 includes radial extensions 23 of different lengths to include radial extensions 23 that abut against the tubular cover 41 and radial extensions 23 that are spaced apart by gaps S1 from the cover 41. The gaps S1 may be formed between each radial extension 23 and the cover 41.

The above embodiment and the modified examples include the gaps S1. However, the gaps S1 may be omitted.

In the above embodiment, the thin portion 23a is arranged over the entire radial extension 23. Instead, part of the radial extension 23 may include the thin portion 23a. Alternatively, the thin portion 23a may be omitted.

In the above embodiment, the thin portion 23a is formed by pressing the radial extension 23. Instead, the thin portion 23a may be formed through a different process. As long as the radial extension 23 includes an axially cut out cross-sectional portion having a reduced cross-sectional area, such a portion has a high magnetic resistance. This limits the generation of eddy current.

In the above embodiment, the entire magnet 26 is integrally formed. However, there is no limit to such a structure. A single magnet may include a pair of poles, and such magnets may be arranged in the circumferential direction.

In the above embodiment, the stators 13 and 14 are arranged at the two axial sides of the rotor 12. Instead, the stator 13 or 14 may be arranged only at one axial side of the rotor 12.

In the above embodiment, the rotor core 21 is separate from the rotation shaft 11. Instead, the rotor core 21 may be formed integrally with the rotation shaft 11.

The above embodiment and each of the modified examples may be combined.

The invention claimed is:

1. An axial gap motor rotor opposing a stator in an axial direction, the axial gap motor rotor comprising:
   a rotor core; and
   a magnet arranged on the rotor core, wherein the magnet is configured so that one axial end includes magnetic poles that alternately change in a circumferential direction, the magnetic poles being located at two axial ends of the rotor core and coupled together in the circumferential direction respectively at the two axial ends, wherein
   the rotor core includes a base, which is located at a center in a radial direction, and radial extensions, which are extended from the base outward in the radial direction and arranged in the circumferential direction,
   the magnet is configured to at least partially overlap the radial extensions in the axial direction, and
   the radial extensions are located to include a boundary of adjacent ones of the magnetic poles in the circumferential direction.

2. The axial gap motor rotor according to claim 1, wherein each of the radial extensions includes a thin portion that is thinner in the axial direction than other portions of the rotor core.

3. The axial gap motor rotor according to claim 1, wherein
   the rotor core includes an outer circumferential portion located at a radially outer side of the radial extensions and extended in the circumferential direction from the radial extensions, and
   the rotor core includes a magnetic path interruption portion configured to interrupt a magnetic path arranged in at least either one of the radial extensions and the outer circumferential portion.

4. The axial gap motor rotor according to claim 2, wherein
   the rotor core includes an outer circumferential portion located at a radially outer side of the radial extensions and extended in the circumferential direction from the radial extensions, and
   the rotor core includes a magnetic path interruption portion configured to interrupt a magnetic path arranged in at least either one of the radial extensions and the outer circumferential portion.

5. The axial gap motor rotor according to claim 4, wherein
   the outer circumferential portion is thicker in the axial direction than the thin portion, and
   the outer circumferential portion abuts against the magnet in the radial direction.

6. An axial gap motor comprising:
   the axial gap motor rotor according to claim 1; and
   the stator opposing the axial gap motor rotor in the axial direction.

7. The axial gap motor according to claim 6, wherein
   the stator is arranged at two axial sides of the axial gap motor rotor, and
   two axial sides of the radial extensions of the axial gap motor rotor are configured to be covered by the magnet.

8. An axial gap motor comprising:
   the axial gap motor rotor according to claim 2; and
   the stator opposing the axial gap motor rotor in the axial direction.

9. The axial gap motor according to claim 8, wherein
   the stator is arranged at two axial sides of the axial gap motor rotor, and
   two axial sides of the radial extensions of the axial gap motor rotor are configured to be covered by the magnet.

10. An axial gap motor comprising:
    the axial gap motor rotor according to claim 3; and
    the stator opposing the axial gap motor rotor in the axial direction.

11. The axial gap motor according to claim 10, wherein
    the stator is arranged at two axial sides of the axial gap motor rotor, and
    two axial sides of the radial extensions of the axial gap motor rotor are configured to be covered by the magnet.

12. An axial gap motor comprising:
    the axial gap motor rotor according to claim 4; and
    the stator opposing the axial gap motor rotor in the axial direction.

13. The axial gap motor according to claim 12, wherein
    the stator is arranged at two axial sides of the axial gap motor rotor, and
    two axial sides of the radial extensions of the axial gap motor rotor are configured to be covered by the magnet.

14. An axial gap motor comprising:
    the axial gap motor rotor according to claim 5; and
    the stator opposing the axial gap motor rotor in the axial direction.

15. The axial gap motor according to claim 14, wherein
    the stator is arranged at two axial sides of the axial gap motor rotor, and two axial sides of the radial extensions of the axial gap motor rotor are configured to be covered by the magnet.

16. The axial gap motor rotor according to claim 1, wherein:
the rotor core includes an outer circumferential portion located at a radially outer side of the radial extensions and extended in the circumferential direction from the radial extensions, and
the base, the radial extensions and the outer circumferential portion are integrally formed.

17. The axial gap motor rotor according to claim 1, wherein:
the magnet is formed integrally with the rotor core.

18. The axial gap motor rotor according to claim 4, wherein:
the magnetic path interruption portion comprises a gap that completely separates a first portion of the outer circumferential portion from a second portion of the circumferential portion, configured to interrupt a magnetic path arranged in at least either one of the radial extensions and the outer circumferential portion.

19. The axial gap motor rotor according to claim 4, wherein:
the magnetic path interruption portion comprises a gap that completely separates an inner portion of at least one of the radial extensions from an outer portion of the at least one of the radial extensions.

20. The axial gap motor rotor according to claim 4, wherein:
a number of magnetic interrupt portions matches a number of the radial extensions.

* * * * *